(12) United States Patent
Al-Somani et al.

(10) Patent No.: US 9,419,789 B2
(45) Date of Patent: Aug. 16, 2016

(54) METHOD AND APPARATUS FOR SCALAR MULTIPLICATION SECURE AGAINST DIFFERENTIAL POWER ATTACKS

(71) Applicant: UMM AL-QURA UNIVERSITY, Makkah (SA)

(72) Inventors: Turki F Al-Somani, Makkah (SA); Hilal Houssain, Jeddah (SA)

(73) Assignee: UMM AL-QURA UNIVERSITY, Makkah (SA)

( * ) Notice: Subject to any disclaimer, the term of this patent is extended or adjusted under 35 U.S.C. 154(b) by 105 days.

(21) Appl. No.: 14/384,458

(22) PCT Filed: Sep. 5, 2014

(86) PCT No.: PCT/IB2014/001754
§ 371 (c)(1),
(2) Date: Sep. 11, 2014

(87) PCT Pub. No.: WO2016/034912
PCT Pub. Date: Mar. 10, 2016

(65) Prior Publication Data
US 2016/0072622 A1    Mar. 10, 2016

(51) Int. Cl.
H04L 9/00 (2006.01)
H04L 9/30 (2006.01)
G06F 7/72 (2006.01)

(52) U.S. Cl.
CPC .............. H04L 9/003 (2013.01); G06F 7/725 (2013.01); H04L 9/3066 (2013.01); G06F 2207/7223 (2013.01); G06F 2207/7252 (2013.01)

(58) Field of Classification Search
None
See application file for complete search history.

(56) References Cited

U.S. PATENT DOCUMENTS

| | | | |
|---|---|---|---|
| 5,613,004 A * | 3/1997 | Cooperman | G06T 1/0021 348/E7.056 |
| 6,243,467 B1 | 6/2001 | Reiter et al. | |
| 6,252,960 B1 | 6/2001 | Seroussi | |
| 7,162,031 B1 * | 1/2007 | Roelofsen | H04L 9/0625 380/277 |
| 7,162,033 B1 | 1/2007 | Coron | |
| 8,379,844 B2 | 2/2013 | Ebeid | |
| 8,542,820 B2 | 9/2013 | Fischer | |
| 2007/0098167 A1 * | 5/2007 | Ueda | G11B 20/00086 380/217 |
| 2009/0214023 A1 * | 8/2009 | Al-Somani | G06F 7/725 380/28 |
| 2011/0179286 A1 * | 7/2011 | Spalka | G06F 21/6254 713/189 |
| 2014/0105381 A1 | 4/2014 | Al-Somani et al. | |

FOREIGN PATENT DOCUMENTS

WO    2012 090289    7/2012

OTHER PUBLICATIONS

Feng, M., et al., "Signed MSB-Set Comb Method for Elliptic Curve Point Multiplication" ISPEC, LNCS, vol. 3903, pp. 13-24, (2006).
International Search Report and Written Opinion issued Jun. 9, 2015 in PCT/IB2014/001754.
M. Joye, "Recovering lost efficiency of exponentiation algorithms on smart cards" Electronics Letters, vol. 38, No. 19, XP6019065A, Sep. 12, 2002, 2 Pages.

* cited by examiner

Primary Examiner — Peter Poltorak
(74) Attorney, Agent, or Firm — Oblon, McClelland, Maier & Neustadt, L.L.P.

(57) ABSTRACT

A method of scalar multiplication to obtain the scalar product between a key and a point on an elliptic curve, wherein the secret is m bits long. In selected embodiments, the first step is to partition the secret into two partitions each with m/2 bits. Point-doubling operations are performed on the point and stored into three buffers. Point additions are performed at randomized time intervals thereby preventing the method from being susceptible to differential power analysis attacks.

20 Claims, 4 Drawing Sheets

METHOD AND APPARATUS FOR SCALAR MULTIPLICATION SECURE AGAINST DIFFERENTIAL POWER ATTACKS

BACKGROUND

Cryptography systems are commonly used for providing secret communication of a text message or a cryptographic "key," or for authenticating identity of a sender via a digital signature. Once encoded, information is generally stored in a computer file (on a disk, for example) or transmitted to a desired recipient. So-called "public key cryptography" uses two asymmetric "keys," or large numbers, consisting of a public key and private key pair. If the public key is used to encode information according to a known algorithm, then the private key is usually needed by the recipient to decode that information, and vice-versa. Public key cryptography relies upon complex mathematical functions by which the public and private keys are related, such that it is extremely difficult to derive the private key from the public key, even with today's high speed processing computers.

One type of public key cryptography system is based upon elliptic curve representations and related mathematics and processing. As an end product of such processing, at least one coded block of information is created and represented as a data point having both X and Y coordinates, with each coordinate being a number between zero and $2N-1$; if a large quantity of information is to be enciphered, there may be many such points, each point represented by at least 2N bits of information.

In these cryptographic systems, a finite field is also chosen, i.e., $F_{2^N}$, where N denotes the number of binary bits used by a computer to represent an element of the finite field. An irreducible generator polynomial or order N is then selected which defines the arithmetic operations in the field. The coefficients of an equation defining an elliptic curve are then selected, and a point P (having X and Y coordinates) on the elliptic curve. Once these terms are chosen, a point addition operation is defined, and from it a point multiplication operation is thereby defined, $$kP = P + P + P + \ldots + P (k \text{ times})$$

i.e., P is added to itself $k-1$ times. With these terms, a private key consisting of one number, such as the number k, and a public key consisting of the product of the point P and the private key (the product being constrained by the finite field and the elliptic curve chosen) may be selected and used for public key cryptographic applications.

Multiplication or, more precisely, scalar multiplication is the dominant operation in elliptic curve cryptography. The speed at which multiplication can be done determines the performance of an elliptic curve method. Multiplication of a point P on an elliptic curve by an integer k may be realized by a series of additions (i.e., $k*P = P + P + \ldots + P$, where the number of Ps is equal to k). This is very easy to implement in hardware since only an elliptic adder is required, but it is very inefficient. That is, the number of operations is equal to k which may be very large.

The classical approach to elliptic curve multiplication is a double and add approach. For example, if a user wishes to realize $k*P$, where $k=25$ then 25 is first represented as a binary expansion of 25. That is, 25 is represented as a binary number 11001. Next, P is doubled a number of times equal to the number of bits in the binary expansion minus 1. For ease in generating an equation of the number of operations, the number of doubles is taken as m rather than $m-1$. The price for simplicity here is being off by 1. In this example, the doubles are 2P, 4P, 8P, and 16P. The doubles correspond to the bit locations in the binary expansion of 25 (i.e., 11001), except for the 1s bit. The doubles that correspond to bit locations that are then added along with P if the is bit is a 1. The number of adds equals the number of 1s in the binary expansion. In this example, there are three additions since there are three 1s in the binary expansion of 25 (i.e., 11001). So, $25P = 16P + 8P + P$.

On average, there are m/2 1s in k. This results in m doubles and m/2 additions for a total of 3m/2 operations. Since the number of bits in k is always less than the value of k, the double and add approach requires fewer operations than does the addition method described above. Therefore, the double and add approach is more efficient (i.e., faster) than the addition approach.

While working on an elliptic curve allows smaller parameters relative to a modular arithmetic based system offering the same security, some of the efficiency advantage of smaller parameters is offset by the added complexity of doing arithmetic on an elliptic curve as opposed to ordinary modular arithmetic. For purposes of determining efficiency, elliptic doubles and elliptic additions are often grouped and considered elliptic operations. To gain even more efficiency advantages by going to elliptic curves, cryptographers seek ways to reduce the cost of an elliptic curve operation, or reduce the number of elliptic operations required. An elliptic curve method that requires fewer operations, or more efficiently executable operations, would result in an increase in the speed, or performance, of any device that implements such a method.

Additionally, the double and add approach is susceptible to a power analysis attack (PAA). It became clear that the implementation of a public key enciphering algorithm of the elliptical curve type on a smart card was vulnerable to attacks consisting of a differential analysis of current consumption making it possible to find the private deciphering key. These attacks are known as a Differential Power Analysis (DPA) attacks. The principle of these DPA attacks is based on the fact that the current consumption of the microprocessor executing the instructions varies according to the data item being manipulated.

The foregoing "background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention. The foregoing paragraphs have been provided by way of general introduction, and are not intended to limit the scope of the following claims. The described embodiments, together with further advantages, will be best understood by reference to the following detailed description taken in conjunction with the accompanying drawings.

SUMMARY OF THE INVENTION

In one nonlimiting embodiment, the present disclosure provides a method of scalar multiplication in a cryptography apparatus to obtain a scalar product of a point and a key. The method includes obtaining the key in the cryptography apparatus, partitioning the key into a plurality of partitions, and performing a first plurality of point-doubling operations on the point. The method also includes storing point values in a plurality of buffers, wherein which buffers of the plurality of buffers the point values are stored in is determined by bit values of the plurality of partitions, the stored point values being the values of the point before point-doubling operations of the first plurality of point-doubling operations. Moreover, the method includes calculating a plurality of intermediate scalar multiplication values by performing point-addition operations, wherein each intermediate scalar multiplication value is a sum over all stored point values in a respective buffer of the plurality of buffers, and the point-addition operations for calculating a plurality of intermediate scalar multiplication values are performed at an at least one point-addition time. In addition, the method includes performing point-addition operations on the plurality of intermediate scalar multiplication values to obtain a first intermediate result and a second intermediate result; performing a second plurality of point-doubling operations on the second intermediate result; and calculating the scalar product of the point and the key by performing a point-addition operation on the first intermediate result and on the second intermediate result.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
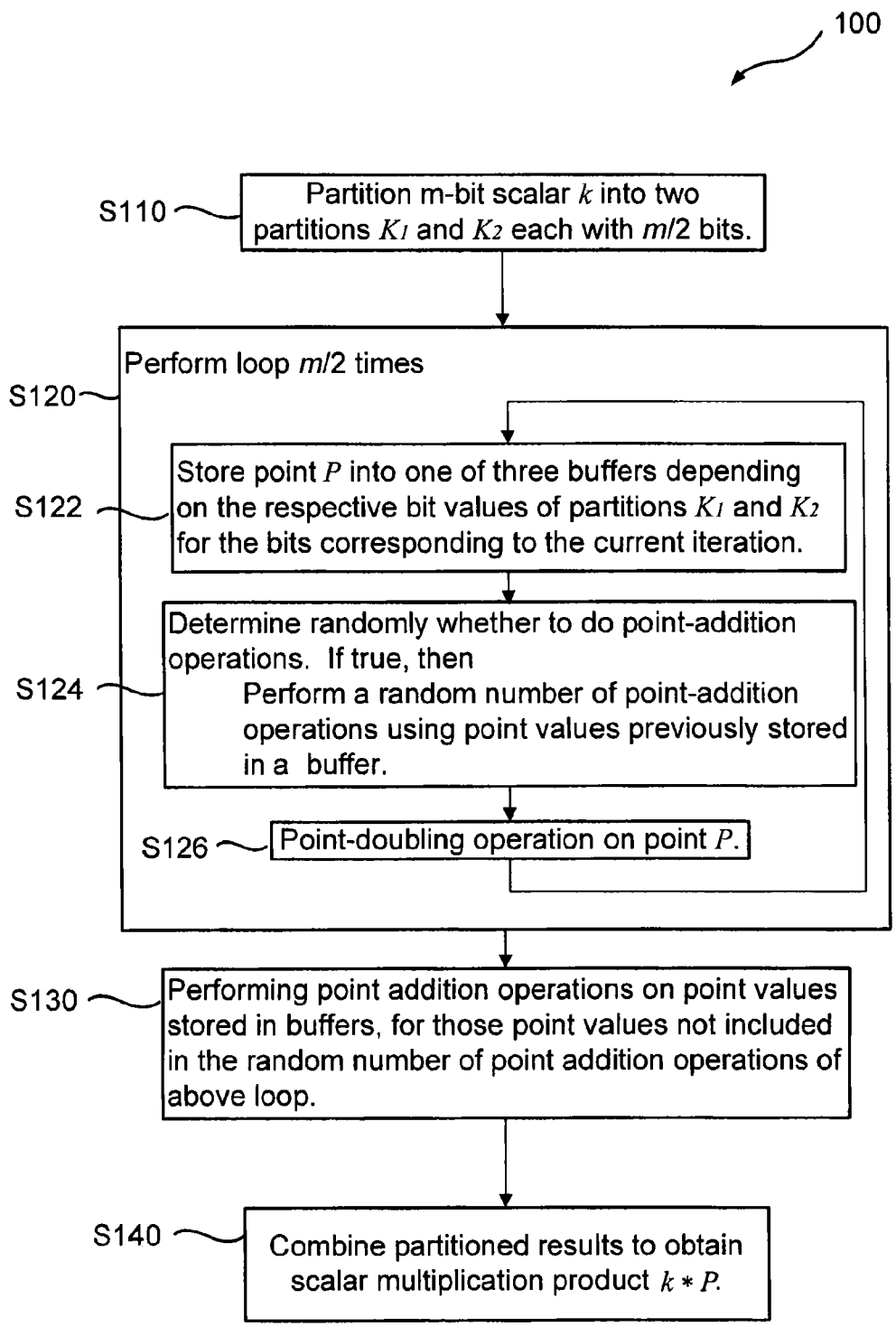
FIG. 1 shows a flow-chart of an embodiment of a scalar multiplication method according to one example.

Referring now to the drawings, wherein like reference numerals designate identical or corresponding parts throughout the several views, FIG. 1 shows a DPA resistant scalar multiplication method 100 that performs efficient scalar multiplication and is robust against attacks of the DPA type.

The method described herein secures scalar multiplication against DPA attacks. The method divides the scalar bit string k into two equal length partitions $K_2=(d_2^{m/2} \ldots d_2^e \ldots d_2^1)_2$, $K_1=(d_1^{m/2} \ldots d_1^e \ldots d_1^1)_2$, inspects (right to left) each bit pair $(d_2^e, d_1^e)$ of the two partitions, and then uses buffers to store point doubling values in order that the method can then delay the point-addition operations by a random time interval. The randomization is also applied to the number of points processed by point addition operation, which results in further confusing the scalar multiplication process, and consequently confuses the power trace of the scalar multiplication process. Using the scalar multiplication method described herein, the point addition operation starts randomly, independently of the value of bit pairs, and performed on a random of points. Consequently, a DPA attack is very difficult since the power trace appears as a repeated series of random length for point doubling, followed by point addition operations where the number of point addition operations is also random.

The method is more efficient than currently used in published scalar multiplication methods; including the non-secure Double-and-Add method for scalar multiplication. Thus, the method is applicable at least for the implementation of elliptic curve cryptography on resource constrained devices like sensor motes, RFID, and smartcards.

In one embodiment, the first step S110 of the DPA resistant scalar multiplication method 100 is partitioning the secret key $k=(d_2^{m/2} \ldots d_2^1 \ldots d_2^1, d_1^{m/2} \ldots d_1^j \ldots d_1^1)_2$ into two partitions of equal size $K_2=(d_2^{m/2} \ldots d_2^j \ldots d_2^1)_2$ and $K_1=(d_1^{m/2} \ldots d_1^j \ldots d_1^1)_2$. The secret key is m bits long, where m is an even number, and the first partition $K_1$ and the second partition $K_2$ are each be m/2 bits long.

In an alternative embodiment the number of partitions can be greater than two. The number of buffers (discussed later) will depend on the number of partitions, such that the number of buffers will be $2^l-1$, where l is the number of partitions. In an exemplary embodiment described herein, the number of buffers is three. The number of intermediate scalar multiplication values (discussed later) is equal to the number of buffers. After considering the case for two partitions discussed herein, the generalization of the disclosed DPA resistant scalar multiplication method to an arbitrary number of partitions will be obvious to one of ordinary skill in the art.

In selected embodiments the length of the key is exactly divisible by the number of partitions. In alternative embodiments, the length of the key is not exactly divisible by the number of partitions and the length of the key can be increased by zero padding to make the length of the key is exactly divisible by the number of partitions. There are still other embodiments, where the method of partitioning a key that is not exactly divisible by the number of partitions is not zero padding the key. These methods include partitioning the number of bits that is exactly divisible by the number of partitions and calculating the remainder of bits in typical double-and-add fashion or any other known scalar multiplication method.

The second step S120 of the DPA resistant scalar multiplication method 100 is to perform a loop m/2 times.

The second step S120 includes a first loop step S122 of storing the point value P into one of three buffers, and which buffer into which the point value P is stored depends on the values of the partition bits corresponding to the current iteration. For the jth iteration the partition bits $d_2^j$ and $d_1^j$ are used to decide into which buffer the point value P will be stored. If $d_2^j$ and $d_1^j$ are both zero, then the point value P will not be stored into any of the buffers. If $d_2^j$ is one and $d_1^j$ is zero, then the point value P will be stored into buffer number two. If $d_2^j$ is zero and $d_1^j$ is one, then the point value P will be stored into buffer number one. If $d_2^j$ and $d_1^j$ are both one, then the point value P will be stored into buffer number three.

The second step S120 includes a second loop step S124 of determining using a random number from a random number generator to decide whether to perform point addition operations using the values stored in the buffers. Then, the third loop step S126 performs a point-doubling operation on the point P.

In conventional methods for scalar point multiplications on elliptical curves, most of the computational resources are devoted towards point-doubling operations and point addition operations. The efficiency of selected embodiments is improved by reducing the number of point-doubling operations and point addition operations. The conventional double and add method uses approximately m point-doubling operations and on average m/2 point addition operations due to half of the bits being zero and point addition operation are avoided for bit values of zero.

However, omitting the point addition operation for bit values of zero may affect the power consumption. Because in the conventional double-and-add method power consumption is correlated with the bit values, an eavesdropper can execute side channel attack using differential power analysis (DPA) to gather information about the secret key. In the disclosed DPA resistant scalar-point multiplication method, the second loop step S124 randomizes the timing of the point addition operations in order to decorrelate the bit values of the secret key with the timing of the point addition operations thus reducing the amount of information available to a side channel attack.

Different embodiments of the disclosed DPA resistant scalar multiplication use various procedures to randomize the timing of the point addition. In certain embodiments a random number generator determines the number of loop iteration before point addition operations are performed after which another random number is generated determining next number of loop iterations before again performing point addition operations and so forth. In certain embodiments, a random number is generated during each loop. If the random number satisfies a predefined criteria, then point addition operations are performed.

There are also multiple procedures by which the number of the point addition operations can be randomized. In certain embodiments, the point addition operations during a single loop iteration can use the values stored in a single buffer, or in alternative embodiments the point addition operations during a single loop iteration can use the values stored in more than one buffer. The number of point addition operations during a single loop iteration can be equal to a random number less than or equal to the values of point P stored in all three of the buffers, or in an alternative embodiment the number of point addition operations during a single loop iteration can be equal to a random number less than or equal to the values of point P stored in a single predetermined buffer. These embodiments are intended to be exemplary and one skilled in the art will recognize that there are many methods to randomize the number of point addition operations during a single loop iteration.

The point addition operations calculate the values of three intermediate scalar multiplication values, $Q_1$, $Q_2$, and $Q_3$. Each intermediate scalar multiplication value is calculated as $$Q_k = \sum_{i=1}^{N_k} B_k[i],$$

where $B_k[i]$ is the ith point value stored in buffer $B_k$, the subscript k=1, 2, or 3 signifies one of the first, second, or third buffer, and $N_k$ is the number of stored values stored in buffer $B_k$ after m/2 loop iterations. In selected embodiments, the point addition operations are performed one at a time for each value stored in each of the buffers, such that each point addition operation in the second loop step S124 is of the type $$Q_k = Q_k + B_k[i].$$

After completing all of the iterations of the second step S120, there can be some stored buffer values that have not been summed into the intermediate scalar multiplication values. In the third step S130 of the DPA resistant scalar multiplication method 100 point addition operations are performed for the stored buffer values that have not yet been summed into the intermediate scalar multiplication values.

In the fourth step S140 of the DPA resistant scalar multiplication method 100, the intermediate scalar multiplication values are further processed to obtain the scalar multiplication product between the secret key k and the elliptic curve point P. This further processing includes preforming point addition operations to obtain $Q_1 = Q_1 + Q_3$ and $Q_2 = Q_3 + Q_2$. Then, m/2 point-doubling operations are performed on the second intermediate scalar multiplication value $Q_2$ after which the scalar multiplication product between the secret key k and the elliptic curve point P is finally given by $$k*P = Q_1 + Q_2.$$

Figure 2:
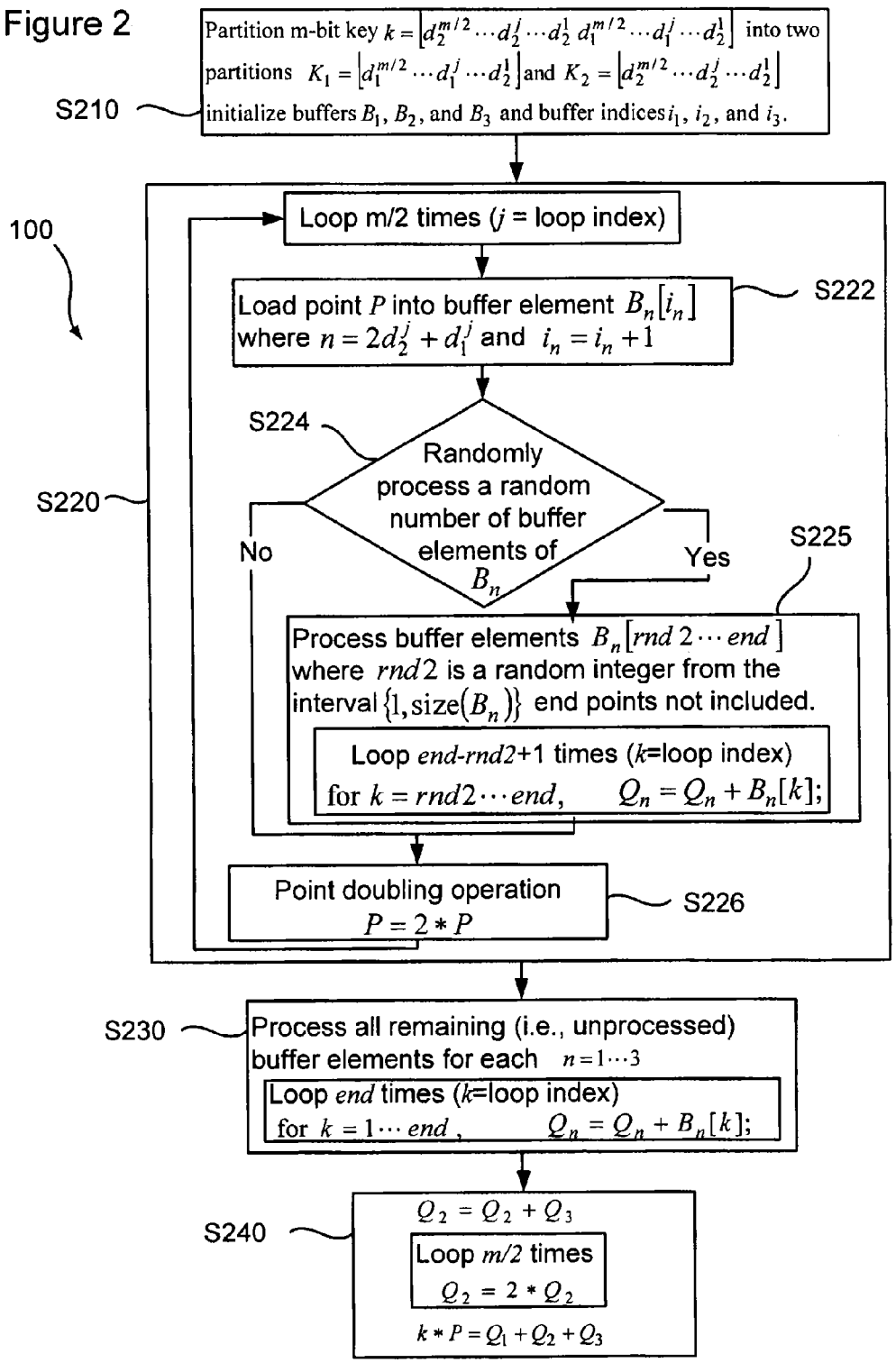
FIG. 2 shows a flow-chart of an embodiment of a scalar multiplication method according to one example.

FIG. 2 shows an alternative embodiment of the DPA resistant scalar multiplication method 100.

The first step S210 of the DPA resistant scalar multiplication method 100 is partitioning the secret key k= $(d_2^{m/2} \ldots d_2^j \ldots d_2^1, d_1^{m/2} \ldots d_1^j \ldots d_1^1)_2$ into two partitions of equal size $K_2 = (d_2^{m/2} \ldots d_2^j \ldots d_2^1)_2$ and $K_1 = (d_1^{m/2} \ldots d_1^j \ldots d_1^1)_2$. The secret key is m bits long, where m is an even number, and the first partition $K_1$ and the second partition $K_2$ are each be m/2 bits long. To three buffers $B_1$, $B_2$, and $B_3$ are initialized to a value of zero. The buffer indices $i_1$, $i_2$, and $i_3$ are initialized to a value of zero.

The second step S220 of the DPA resistant scalar multiplication method 100 is loop that is performed m/2 times.

The first loop step S222 of the second step S220 is to calculate which buffer applies during the current loop iteration, where the buffer that applies during the current loop iteration is $B_n$ where $$n = 2d_2^j + d_1^j.$$

The buffer index $i_n$ is incremented by one. The value of the point P is then loaded into the buffer, $$B_n[i_n] = P.$$

The second loop step S224 of the second step S220 is to randomly determine whether to process point values stored in the buffers by performing point addition operations on the stored values in the buffers. If the answer is "yes, perform point addition operations," then a random number rnd2, which is less than or equal to $i_n$, is generated by a random number generator. Buffer values from buffer index equal to rnd2 to the last value stored in the buffer, end=$i_n$, are each summed to the intermediate scalar multiplication value $Q_n$ to obtain $$Q_n = B_n[k],$$

where k=rnd2 . . . end. The buffer index is then set to $i_n$=rnd2−1.

The third loop step S224 of the second step S220 is to perform a point-doubling operation on point P. Then the loop is repeated and the loop index j is incremented.

After completing all of the iterations of the second step S220, there can be some stored buffer values that have not been summed into the intermediate scalar multiplication values. In the third step S230 of the DPA resistant scalar multiplication method 100 point addition operations are performed for the stored buffer values that have not yet been summed into the intermediate scalar multiplication values.

The fourth step S240 of the DPA resistant scalar multiplication method 100 the intermediate scalar multiplication values are further processed to obtain the scalar multiplication product between the secret key k and the elliptic curve point P. This further processing includes preforming point addition operations to obtain $Q_2 = Q_3 + Q_2$. Then, m/2 point-doubling operations are performed on the second intermediate scalar multiplication value $Q_2$. The final result is given by $$k*P = Q_1 + Q_2 + Q_3.$$

In a third embodiment the DPA resistant scalar multiplication method 100 is given by the pseudo code INPUT: P, D2 = $(d_2^{m/2} \ldots d_2^e \ldots d_2^1)_2$, D1 = $(d_1^{m/2} \ldots d_1^e \ldots d_1^1)_2$;
d = $D_2 || D_1$ is a scalar, k is the scalar length.
OUTPUT: $Q_1$ = d*P
1   $i_1 = i_2 = i_3 = 1$
2   For e = 1 to m/2 do
2.1     n = $2d_2^e + d_1^e$
2.2     If n > 0, then
2.2.1       Bn $[i_n]$ = P
2.2.2       r = RNG (<Capacity of $B_n$); random number generator for a number less than the capacity of buffer $B_n$
2.2.3       If $i_n$ = r Then -continued

| | | |
|---|---|---|
| 2.2.4 | | $j_n$ = RNG ($0 < j_n < i_n$); random number generator for a number less than $i_n$ |
| 2.2.4.1 | | For s = $j_n$ to $i_n$ do |
| 2.2.4.1.1 | | $Q_n = Q_n + B_n [s]$ |
| 2.2.4.2 | | $i_n = j_n - 1$ |
| 2.2.5 | | Else |
| 2.2.5.1 | | $i_n = i_n + 1$ |
| 2.3 | | P = 2*P |
| 2.4 | | If e = m/2, Then |
| 2.4.1 | | For n= 1 to 3 do |
| 2.4.1.1 | | If $i_n$ >1 Then |
| 2.4.1.1.1 | | For s = 1 to $i_n$ − 1 do |
| 2.4.1.1.1.1 | | $Q_n = Q_n + B_n [s]$ |
| 3 | | $Q_2 = Q_2 + Q_3$ |
| 4 | | For e = 1 to m/2 do |
| 4.1 | | $Q_2 = 2*Q_2$ |
| 5 | | $Q_1 = Q_1 + Q_2 + Q_3$ |
| 6 | | Return $Q_1$ |

The method uses m point doublings and on average (3m/8) point additions. This method outperforms the Double-and-Add method by reducing the point additions by m/8, and this is because point addition operation is not perform for the bit pairs $k_2^e, k_1^e$=(0,0), which occurs with a probability of ¼. This performance improves to m point doublings and an average of m/4 point additions when non-adjacent form (NAF) encoding is used. The method requires no extra dummy computations to secure scalar multiplication against DPA attacks.

The security of the method depends on different levels of confusion. The first level of confusion is realized by inspecting bit pairs instead of a single bit of the scalar, and thus increase possible values to 4 (00, 01, 10, 11) instead of 2 (0, 1). The second level of confusion is achieved by delaying the point addition operation by a random number of bits using buffers for interim points storage. The third level of confusion is processing a random number of points from buffers is the third level. Randomization is applied to both the size of the buffers and the number of processed points for point addition in the buffers. Therefore, the confusion level of the method is very high since it is not possible to guess the number of processed bit pairs (01, 10, 11) between two consecutive series of point double operations.

Figure 3:
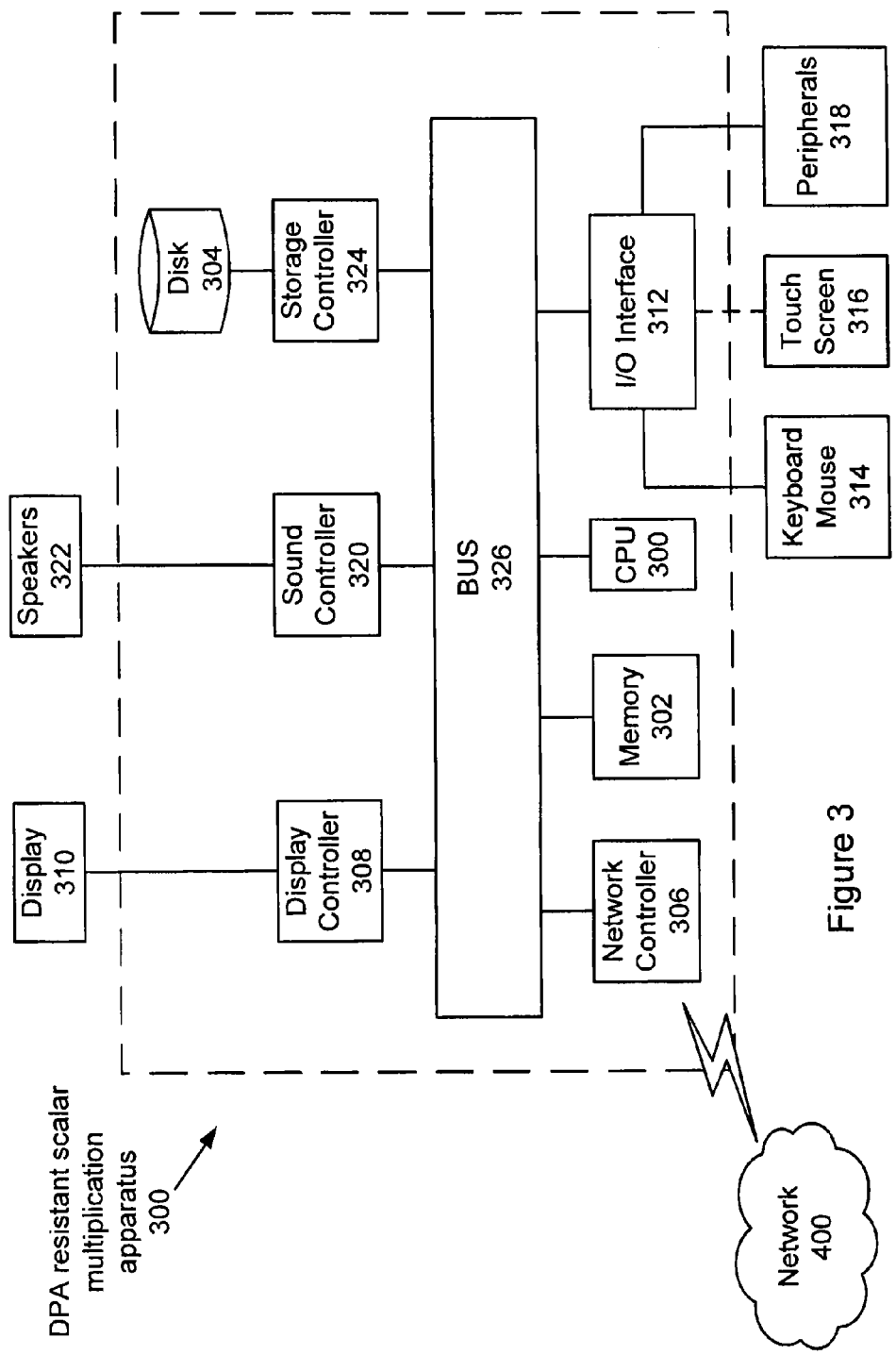
FIG. 3 shows an embodiment of computer hardware for performing a scalar multiplication method according to one example.

FIG. 3 shows computational hardware for an implementation of a DPA resistant scalar multiplication apparatus 300 to perform the DPA resistant scalar multiplication method 100. This hardware can be used in the cryptography network shown in FIG. 4 by either the sender 402, the receiver 404, or both in order to create a shared secret key from a pair of public keys.

Next, a hardware description of the DPA resistant scalar multiplication apparatus 300 according to exemplary embodiments is described with reference to FIG. 3. In FIG. 3, the DPA resistant scalar multiplication apparatus 300 includes a CPU 301 which performs the processes described above. The process data and instructions may be stored in memory 302. These processes and instructions may also be stored on a storage medium disk 304 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the DPA resistant scalar multiplication apparatus 300 communicates, such as a server or computer.

Further, the claimed advancements may be provided as a utility application, background daemon, or component of an operating system, or combination thereof, executing in conjunction with CPU 301 and an operating system such as Microsoft Windows 7, UNIX, Solaris, LINUX, Apple MAC-OS and other systems known to those skilled in the art.

CPU 301 may be a Xenon or Core processor from Intel of America or an Opteron processor from AMD of America, or may be other processor types that would be recognized by one of ordinary skill in the art. Alternatively, the CPU 301 may be implemented on an FPGA, ASIC, PLD or using discrete logic circuits, as one of ordinary skill in the art would recognize. Further, CPU 301 may be implemented as multiple processors cooperatively working in parallel to perform the instructions of the inventive processes described above.

The DPA resistant scalar multiplication apparatus 300 in FIG. 3 also includes a network controller 306, such as an Intel Ethernet PRO network interface card from Intel Corporation of America, for interfacing with network 400. As can be appreciated, the network 400 can be a public network, such as the Internet, or a private network such as an LAN or WAN network, or any combination thereof and can also include PSTN or ISDN sub-networks. The network 400 can also be wired, such as an Ethernet network, or can be wireless such as a cellular network including EDGE, 3G and 4G wireless cellular systems. The wireless network can also be WiFi, Bluetooth, or any other wireless form of communication that is known.

The DPA resistant scalar multiplication apparatus 300 further includes a display controller 308, such as a NVIDIA GeForce GTX or Quadro graphics adaptor from NVIDIA Corporation of America for interfacing with display 310, such as a Hewlett Packard HPL2445w LCD monitor. A general purpose I/O interface 312 interfaces with a keyboard and/or mouse 314 as well as a touch screen panel 316 on or separate from display 310. General purpose I/O interface also connects to a variety of peripherals 318 including printers and scanners, such as an OfficeJet or DeskJet from Hewlett Packard.

A sound controller 320 is also provided in the DPA resistant scalar multiplication apparatus, such as Sound Blaster X-Fi Titanium from Creative, to interface with speakers/microphone 322 thereby providing sounds and/or music.

The general purpose storage controller 324 connects the storage medium disk 304 with communication bus 326, which may be an ISA, EISA, VESA, PCI, or similar, for interconnecting all of the components of the DPA resistant scalar multiplication apparatus. A description of the general features and functionality of the display 310, keyboard and/or mouse 314, as well as the display controller 308, storage controller 324, network controller 306, sound controller 320, and general purpose I/O interface 312 is omitted herein for brevity as these features are known.

Figure 4:
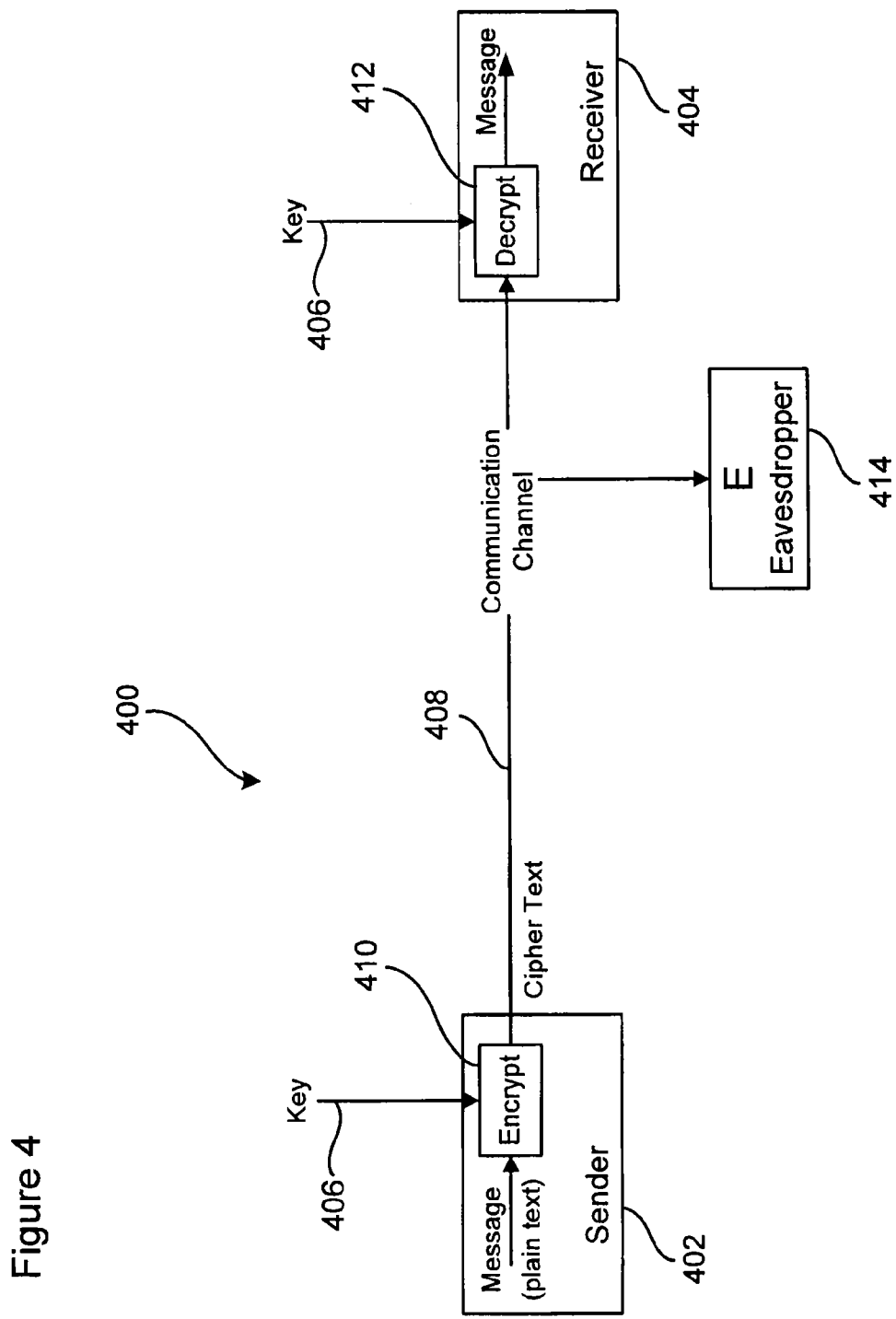
FIG. 4 shows an embodiment of a cryptography system according to one example.

The DPA resistant scalar multiplication apparatus 300 can be used by the sender, receiver, or both as part of a larger cryptography network 400 shown in FIG. 4. The DPA resistant scalar multiplication apparatus 300 is used to calculate the scalar product of performing cryptographic communication using the disclosed DPA resistant scalar multiplication method 100 is shown in FIG. 4.

The computational hardware disclosed in FIG. 3 can be used by both the sender 402 and the receiver 404 in order to generate a shared cryptographic key by performing scalar multiplications. Either the Diffie-Hellman scheme, ElGamal scheme, or the like can be used to create the shared cryptographic key.

In an implementation of the network 400, the network includes two communication nodes: a sender 402 and a receiver 404. Both the receiver and the sender can use the DPA resistant scalar multiplication apparatus 300 to perform scalar multiplications. First, the sender 402 and receiver 404 agree on the parameters of an elliptical curve and a generator (the base point). The r sender 402 and receiver 404 each choose a respective private key and each calculate a public key, which is the scalar product between the generator and their respective private key. Next, the sender 402 and receiver 404 exchange their public keys via the unsecure communication channel 408, and each calculates a shared key 406 by calculating the scalar product between the received public key and the private key. Having calculated the shared key 406, the sender 402 can use the key 406 to encrypt 410 a plain text message in order to obtain cypher text message that is transmitted through the communication channel 408 to the receiver 404. Using the key 406, the receiver 404 can then decrypt 412 the cypher text message to retrieve the plain text message.

Although the eavesdropper 414 may have access to the elliptic curve parameters, the generator, and the public keys, the eavesdropper cannot decipher the cipher text without knowledge of the shared key 406. Thus, the security of the cryptographic methods relies on the asymmetry that calculating the shared key 406 is mathematically difficult and time consuming for the eavesdropper 414 while it is simple for the sender and receiver given their knowledge of one of the private keys. In elliptic curve cryptography the mathematically difficult problem the eavesdropper must solve is the elliptic curve discrete logarithm problem. FIG. 4 shows the eavesdropper having access to the unsecure communication channel 408, but not shown in FIG. 4 is the possibility of side channel attacks by the eavesdropper 414. The difficulty of solving the elliptic curve discrete logarithm provides security against direct attacks, like that shown in FIG. 4, and using the DPA resistant scalar multiplication apparatus 300 provides security against side channel DPA attacks.

While certain embodiments have been described, these embodiments have been presented by way of example only, and are not intended to limit the scope of the inventions. Indeed, the novel methods, apparatuses and systems described herein may be embodied in a variety of other forms; furthermore, various omissions, substitutions and changes in the form of the methods, apparatuses and systems described herein may be made without departing from the spirit of the inventions. The accompanying claims and their equivalents are intended to cover such forms or modifications as would fall within the scope and spirit of the inventions.

The above disclosure also encompasses the embodiments listed below.

(1) A method of scalar multiplication in a cryptography apparatus to obtain a scalar product of a point and a key, the method including: obtaining the key in the cryptography apparatus, partitioning the key into a plurality of partitions, performing a first plurality of point-doubling operations on the point, storing point values in a plurality of buffers, wherein which buffers of the plurality of buffers the point values are stored in is determined by bit values of the plurality of partitions, the stored point values being the values of the point before point-doubling operations of the first plurality of point-doubling operations, and calculating a plurality of intermediate scalar multiplication values by performing point-addition operations, wherein each intermediate scalar multiplication value is a sum over all stored point values in a respective buffer of the plurality of buffers, and the point-addition operations for calculating a plurality of intermediate scalar multiplication values are performed at an at least one point-addition time.

(2) The method of (1), further including: performing point-addition operations on the plurality of intermediate scalar multiplication values to obtain a first intermediate result and a second intermediate result, performing a second plurality of point-doubling operations on the second intermediate result, and calculating the scalar product of the point and the key by performing a point-addition operation on the first intermediate result and on the second intermediate result.

(3) The method of (1) or (2), wherein the key has m bits, where m is an even integer, and the plurality of partitions includes a first partition having m/2 bits and a second partition having m/2 bits.

(4) The method of any one of (1) to (3), wherein the at least one point-addition time includes a final point-addition time occurring after the first plurality of point-doubling operations and before the second plurality of point-doubling operations, and at the final point-addition time performing point-addition operations on all the stored point values not previously used in point-addition operations in order to calculate the plurality of intermediate scalar multiplication values.

(5) The method of any one of (1) to (4), wherein the step of calculating the plurality of intermediate scalar multiplication values further includes generating at least one first random number. If the at least one first random number satisfies a predetermined criterion, then the at least one point-addition time includes an at least one random point-addition time occurring before the final point-addition time. Also, the method includes performing at each at least one random point-addition time a number of point-addition operations to calculate the plurality of intermediate scalar multiplication values.

(6) The method of any one of (1) to (5), wherein at each at least one random point-addition time, the number of point-addition operations is equal to a second random number.

(7) The method of any one of (1) to (6), wherein the plurality of buffers includes a first buffer, a second buffer, and a third buffer, the plurality of intermediate scalar multiplication values includes a first intermediate scalar multiplication value, a second intermediate scalar multiplication value, and a third intermediate scalar multiplication value, the respective first, second, and third intermediate scalar multiplication values are calculated by performing point-addition operations using the stored point values in the corresponding first, second, and third buffers.

(8) The method of any one of (1) to (7), wherein the step of storing point values in a plurality of buffers is performed according to: if the nth bit of the first partition is a one and the nth bit of the second partition is a zero, then the point value is stored into the first buffer, if the nth bit of the first partition is a zero and the nth bit of the second partition is a one, then the point value is stored in the second buffer, if the nth bit of the first partition is a one and the nth bit of the second partition is a one, then the point value is stored in the third buffer, if the nth bit of the first partition is a zero and the nth bit of the second partition is a zero, then the point value is not stored in the plurality of buffers, and wherein the point value being stored is the value of the point after the n-1th point doubling operation of the first plurality of point doubling operations and before the nth point doubling operation of the first plurality of point doubling operations.

(9) The method of any one of (1) to (8), wherein after the n-1th point doubling operation of the first plurality of point doubling operations and before the nth point doubling operation of the first plurality of point doubling operations, the step of calculating a plurality of intermediate scalar multiplication values is performed according to: if the nth bit of the first partition is a one and the nth bit of the second partition is a zero, then the current point-addition operations performed contribute to calculating the first intermediate scalar multiplication value, if the nth bit of the first partition is a zero and the nth bit of the second partition is a one, then the current point-addition operations performed contribute to calculating the second intermediate scalar multiplication value, if the nth bit of the first partition is a one and the nth bit of the second partition is a one, then the current point-addition operations performed contribute to calculating the third intermediate scalar multiplication value, if the nth bit of the first partition is a zero and the nth bit of the second partition is a zero then point-addition operations are currently not performed.

(10) An apparatus for scalar multiplication, including: processing circuitry configured to partition a key into a plurality of partitions, perform a first plurality of point-doubling operations on a point, store point values in a plurality of buffers, wherein which buffers of the plurality of buffers the point values are stored in is determined by bit values of the plurality of partitions, the stored point values being the values of the point before point-doubling operations of the first plurality of point-doubling operations, and calculate a plurality of intermediate scalar multiplication values by performing point-addition operations, wherein each intermediate scalar multiplication value is a sum over all stored point values in a respective buffer of the plurality of buffers, and the point-addition operations for calculating a plurality of intermediate scalar multiplication values are performed at an at least one point-addition time.

(11) The apparatus of (10), wherein the processing circuitry is further configured to perform point-addition operations on the plurality of intermediate scalar multiplication values to obtain a first intermediate result and a second intermediate result, perform a second plurality of point-doubling operations on the second intermediate result, and calculate a scalar product of the point and the key by performing a point-addition operation on the first intermediate result and on the second intermediate result.

(12) The apparatus of (10) or (11), wherein the key has m bits, where m is an even integer and the plurality of partitions includes a first partition having m/2 bits and a second partition having m/2 bits.

(13) The apparatus according of any of (10) to (12), wherein the at least one point-addition time includes, a final point-addition time occurring after the first plurality of point-doubling operations and before the second plurality of point-doubling operations, and if a first random number satisfies a predetermined criterion, an at least one random point-addition time occurring before the final point-addition time, and the processing circuitry is further configured to, perform at each at least one random time a number of point-addition operations to calculate the plurality of intermediate scalar multiplication values, and perform at the final point-addition time a remainder of point-addition operations to calculate the plurality of intermediate scalar multiplication values.

(14) The apparatus according of any of (10) to (13), wherein the number of point-addition operations performed at each at each at least one random point-addition time is equal to a second random number.

(15) The apparatus according of any of (10) to (14), wherein the plurality of buffers includes a first buffer, a second buffer, and a third buffer; the plurality of intermediate scalar multiplication values includes a first intermediate scalar multiplication value, a second intermediate scalar multiplication value, and a third intermediate scalar multiplication value; the respective first, second, and third intermediate scalar multiplication values are calculated by performing point-addition operations using the stored point values in the corresponding first, second, and third buffers; and the processing circuitry is further configured to store stored point values in the plurality of buffers according to, if the nth bit of the first partition is a one and the nth bit of the second partition is a zero, then the point value is stored into the first buffer, if the nth bit of the first partition is a zero and the nth bit of the second partition is a one, then the point value is stored in the second buffer, if the nth bit of the first partition is a one and the nth bit of the second partition is a one, then the point value is stored in the third buffer if the nth bit of the first partition is a zero and the nth bit of the second partition is a zero, then the point value is not stored in the plurality of buffers, and wherein the point value being stored in the buffer is the value of the point after the n-1th point doubling operation of the first plurality of point doubling operations and before the nth point doubling operation of the first plurality of point doubling operations.

(16) The apparatus according of any of (10) to (15), wherein the processing circuitry is further configured to calculate, after the n-1th point doubling operation of the first plurality of point doubling operations and before the nth point doubling operation of the first plurality of point doubling operations, a plurality of intermediate scalar multiplication values according to: if the nth bit of the first partition is a one and the nth bit of the second partition is a zero, then the current point-addition operations performed contribute to calculating the first intermediate scalar multiplication value, if the nth bit of the first partition is a zero and the nth bit of the second partition is a one, then the current point-addition operations performed contribute to calculating the second intermediate scalar multiplication value, if the nth bit of the current first partition is a one and the nth bit of the second partition is a one, then the point-addition operations performed contribute to calculating the third intermediate scalar multiplication value, if the nth bit of the first partition is a zero and the nth bit of the second partition is a zero then point-addition operations are not currently performed.

(17) An elliptic curve cryptography system, including: a first communication node configured to perform scalar multiplication to calculate a cryptography key; and a second communication node having a scalar multiplication apparatus to calculate a cryptography key, the scalar multiplication apparatus having processing circuitry configured to partition a key into a plurality of partitions, perform a first plurality of point-doubling operations on a point, store point values in a plurality of buffers, wherein which buffers of the plurality of buffers the point values are stored in is determined by bit values of the plurality of partitions, the stored point values being the values of the point before point-doubling operations of the first plurality of point-doubling operations, and calculate a plurality of intermediate scalar multiplication values by performing point-addition operations, wherein each intermediate scalar multiplication value is a sum over all stored point values in a respective buffer of the plurality of buffers, and the point-addition operations for calculating a plurality of intermediate scalar multiplication values are performed at an at least one point-addition time.

(18) The system according to (17), wherein the processing circuitry of the scalar multiplication apparatus is further configured to perform point-addition operations on the plurality of intermediate scalar multiplication values to obtain a first intermediate result and a second intermediate result; perform a second plurality of point-doubling operations on the second intermediate result; and calculate a scalar product of the point and the key by performing a point-addition operation on the first intermediate result and on the second intermediate result.

(19) The system according to (17) or (18), wherein the at least one point-addition time includes, a final point-addition time occurring after the first plurality of point-doubling operations and before the second plurality of point-doubling operations, and if a first random number satisfies a predetermined criterion, an at least one random point-addition time occurring before the final point-addition time; and the processing circuitry of the scalar multiplication apparatus is further configured to calculate the plurality of intermediate scalar multiplication values according to perform at each at least one random time a number of point-addition operations to calculate the plurality of intermediate scalar multiplication values, and perform at the final point-addition time a remainder of point-addition operations to calculate the plurality of intermediate scalar multiplication values.

(20) The apparatus according to any one of (10) to (16), wherein the number of point-addition operations performed at each at each at least one random point-addition time is equal to a second random number.

The invention claimed is:

1. A method of scalar multiplication in a cryptography apparatus to obtain a scalar product of a point and a key, the method comprising:
    obtaining the key in the cryptography apparatus;
    partitioning the key into a plurality of partitions;
    performing, using circuitry, a first plurality of point-doubling operations on the point to generate point values;
    storing the point values in a plurality of buffers, wherein
        each buffer is configured to store a plurality of point values,
        in which buffer of the plurality of buffers a respective point value of the point values is stored is determined using a corresponding bit value of each partition of the plurality of partitions, and
        the respective point values are stored in each of the plurality of buffers at least until at least one point-addition time, the at least one point-addition time being determined using a random number;
    calculating, using the circuitry, a plurality of intermediate scalar multiplication values by performing point-addition operations, wherein each intermediate scalar multiplication value is a sum over all stored point values in a respective buffer of the plurality of buffers, and the point-addition operations for calculating the plurality of intermediate scalar multiplication values are performed at the at least one point-addition time; and
    removing a stored point value from the corresponding buffer of the plurality of buffers after a point-addition operation has been performed using the stored point value.

2. The method according to claim 1, further comprising:
    performing, using the circuitry, another point-addition operations on the plurality of intermediate scalar multiplication values to obtain a first intermediate result and a second intermediate result;
    performing, using the circuitry, a second plurality of point-doubling operations on the second intermediate result; and
    calculating, using the circuitry, the scalar product of the point and the key by performing a final point-addition operation on the first intermediate result and on the second intermediate result.

3. The method according to claim 2, wherein
    the key has m bits, m being an even integer, and
    the plurality of partitions includes a first partition having m/2 bits and a second partition having m/2 bits.

4. The method according to claim 2, wherein
    the at least one point-addition time includes a final point-addition time occurring after the first plurality of point-doubling operations and before the second plurality of point-doubling operations, and
    at the final point-addition time, point-addition operations are performed on all of the stored point values that are not previously used in point-addition operations to calculate the plurality of intermediate scalar multiplication values.

5. The method according to claim 4, wherein the calculating of the plurality of intermediate scalar multiplication values further includes
    generating at least one first random number;
    if the at least one first random number satisfies a predetermined criterion, then the at least one point-addition time includes an at least one random point-addition time occurring before the final point-addition time; and
    performing, at each of the at least one random point-addition time, a number of the point-addition operations to calculate the plurality of intermediate scalar multiplication values.

6. The method according to claim 5, wherein the number of the point-addition operations performed at a respective random point-addition time of the at least one random point-addition time is equal to a corresponding second random number.

7. The method according to claim 3, wherein
    the plurality of buffers includes a first buffer, a second buffer, and a third buffer,
    the plurality of intermediate scalar multiplication values includes a first intermediate scalar multiplication value, a second intermediate scalar multiplication value, and a third intermediate scalar multiplication value, and
    the respective first, second, and third intermediate scalar multiplication values are respectively calculated by performing point-addition operations using the respective stored point values in the corresponding first, second, and third buffers.

8. The method according to claim 7, wherein
    the step of storing point values in the plurality of buffers is performed according to, for an nth point value of the point values,
        if an nth bit of the first partition is a one and an nth bit of the second partition is a zero, then the nth point value is stored into the first buffer,
        if the nth bit of the first partition is a zero and the nth bit of the second partition is a one, then the nth point value is stored in the second buffer,
        if the nth bit of the first partition is a one and the nth bit of the second partition is a one, then the nth point value is stored in the third buffer,
        if the nth bit of the first partition is a zero and the nth bit of the second partition is a zero, then the nth point value is not stored in the plurality of buffers, and
        the nth point value is the value of the point after an n-1th point doubling operation of the first plurality of point doubling operations and before an nth point doubling operation of the first plurality of point doubling operations.

9. The method according to claim 8, wherein
    after the n-1th point doubling operation of the first plurality of point doubling operations and before the nth point doubling operation of the first plurality of point doubling operations, the calculating of the plurality of intermediate scalar multiplication values is performed according to if the nth bit of the first partition is a one and the nth bit of the second partition is a zero, then the point-addition operations performed contribute to the calculating of the first intermediate scalar multiplication value, if the nth bit of the first partition is a zero and the nth bit of the second partition is a one, then the point-addition operations performed contribute to the calculating of the second intermediate scalar multiplication value, if the nth bit of the first partition is a one and the nth bit of the second partition is a one, then the point-addition operations performed contribute to the calculating of the third intermediate scalar multiplication value, and if the nth bit of the first partition is a zero and the nth bit of the second partition is a zero then no point-addition operations is performed.

10. An apparatus for scalar multiplication, comprising:
processing circuitry configured to
partition a key into a plurality of partitions;
perform a first plurality of point-doubling operations on a point to generate point values;
store the point values in a plurality of buffers, wherein
each buffer is configured to store a plurality of point values,
in which buffer of the plurality of buffers a respective point value of the point values is stored is determined using a corresponding bit value of each partition of the plurality of partitions, and
the respective point values are stored in each of the plurality of buffers at least until at least one point-addition time, the at least one point-addition time being determined using a random number;
calculate a plurality of intermediate scalar multiplication values by performing point-addition operations, wherein each intermediate scalar multiplication value is a sum over all stored point values in a respective buffer of the plurality of buffers, and the point-addition operations for calculating the plurality of intermediate scalar multiplication values are performed at the at least one point-addition time; and
removing a stored point value from the corresponding buffer of the plurality of buffers after a point-addition operation has been performed using the stored point value.

11. The apparatus according to claim 10, wherein the processing circuitry is further configured to
perform another point-addition operations on the plurality of intermediate scalar multiplication values to obtain a first intermediate result and a second intermediate result;
perform a second plurality of point-doubling operations on the second intermediate result; and
calculate a scalar product of the point and the key by performing a final point-addition operation on the first intermediate result and on the second intermediate result.

12. The apparatus according to claim 11, wherein
the key has m bits, m being an even integer, and
the plurality of partitions includes a first partition having m/2 bits and a second partition having m/2 bits.

13. The apparatus according to claim 11, wherein
the at least one point-addition time includes
a final point-addition time occurring after the first plurality of point-doubling operations and before the second plurality of point-doubling operations, and
at least one random point-addition time that occurs before the final point-addition time, when a first random number satisfies a predetermined criterion, and
the processing circuitry is further configured to
perform at each of the at least one random time a number of the point-addition operations to calculate the plurality of intermediate scalar multiplication values, and
perform at the final point-addition time a remainder of the point-addition operations to calculate the plurality of intermediate scalar multiplication values.

14. The apparatus according to claim 13, wherein the number of the point-addition operations performed at a respective random point-addition time of the at least one random point-addition time is equal to a corresponding second random number.

15. The apparatus according to claim 12, wherein
the plurality of buffers includes a first buffer, a second buffer, and a third buffer,
the plurality of intermediate scalar multiplication values includes a first intermediate scalar multiplication value, a second intermediate scalar multiplication value, and a third intermediate scalar multiplication value,
the respective first, second, and third intermediate scalar multiplication values are calculated by performing point-addition operations using the stored point values in the corresponding first, second, and third buffers, and
the processing circuitry is further configured to store stored point values in the plurality of buffers according to, for an nth point value of the point values,
if an nth bit of the first partition is a one and an nth bit of the second partition is a zero, then the nth point value is stored into the first buffer,
if the nth bit of the first partition is a zero and the nth bit of the second partition is a one, then the nth point value is stored in the second buffer,
if the nth bit of the first partition is a one and the nth bit of the second partition is a one, then the nth point value is stored in the third buffer
if the nth bit of the first partition is a zero and the nth bit of the second partition is a zero, then the nth point value is not stored in the plurality of buffers, and
wherein the point value is the value of the point after an n-1th point doubling operation of the first plurality of point doubling operations and before an nth point doubling operation of the first plurality of point doubling operations.

16. The apparatus according to claim 15, wherein
the processing circuitry is further configured to calculate, after the n-1th point doubling operation of the first plurality of point doubling operations and before the nth point doubling operation of the first plurality of point doubling operations, a plurality of intermediate scalar multiplication values according to
if the nth bit of the first partition is a one and the nth bit of the second partition is a zero, then the point-addition operations performed contribute to the calculating of the first intermediate scalar multiplication value,
if the nth bit of the first partition is a zero and the nth bit of the second partition is a one, then the point-addition operations performed contribute to the calculating of the second intermediate scalar multiplication value, if the nth bit of the first partition is a one and the nth bit of the second partition is a one, then the point-addition operations performed contribute to the calculating of the third intermediate scalar multiplication value, and if the nth bit of the first partition is a zero and the nth bit of the second partition is a zero then no point-addition operations is performed.

17. An elliptic curve cryptography system, comprising:
a first communication node configured to perform scalar multiplication to calculate a cryptography key; and
a second communication node having a scalar multiplication apparatus to calculate a cryptography key, the scalar multiplication apparatus having processing circuitry configured to
    partition a key into a plurality of partitions,
    perform a first plurality of point-doubling operations on a point to generate point values,
    store the point values in a plurality of buffers, wherein each buffer is configured to store a plurality of point values,
        in which buffer of the plurality of buffers a respective point value of the point values is stored is determined using a corresponding bit value of each partition of the plurality of partitions, and
        the respective point values are stored in each of the plurality of buffers at least until at least one point-addition time, the at least one point-addition time being determined using a random number;
    calculate a plurality of intermediate scalar multiplication values by performing point-addition operations, wherein each intermediate scalar multiplication value is a sum over all stored point values in a respective buffer of the plurality of buffers, and the point-addition operations for calculating the plurality of intermediate scalar multiplication values are performed at the at least one point-addition time; and
    removing a stored point value from the corresponding buffer of the plurality of buffers after a point-addition operation has been performed using the stored point value.

18. The system according to claim 17, wherein the processing circuitry of the second scalar multiplication apparatus is further configured to
    perform another point-addition operations on the plurality of intermediate scalar multiplication values to obtain a first intermediate result and a second intermediate result,
    perform a second plurality of point-doubling operations on the second intermediate result, and
    calculate a scalar product of the point and the key by performing a final point-addition operation on the first intermediate result and on the second intermediate result.

19. The system according to claim 18, wherein
the at least one point-addition time includes
    a final point-addition time occurring after the first plurality of point-doubling operations and before the second plurality of point-doubling operations, and
    at least one random point-addition time occurring before the final point-addition time, when a first random number satisfies a predetermined criterion, and
the processing circuitry of the scalar multiplication apparatus is further configured to perform the calculating of the plurality of intermediate scalar multiplication values by
    performing, at each of the at least one random time, a respective number of the point-addition operations to calculate the plurality of intermediate scalar multiplication values, and
    performing, at the final point-addition time, a remainder of point-addition operations to calculate the plurality of intermediate scalar multiplication values.

20. The apparatus according to claim 19, wherein the number of the point-addition operations performed at a respective random point-addition time of the at least one random point-addition time is equal to a corresponding second random number.

* * * * *